(12) United States Patent
Saltenberger

(10) Patent No.: US 9,109,618 B2
(45) Date of Patent: Aug. 18, 2015

(54) BLIND RIVET WITH A PLASTIC RIVET BODY

(71) Applicant: NEWFREY LLC, Newark, DE (US)

(72) Inventor: Reimar Saltenberger, Geissen (DE)

(73) Assignee: NEWFREY LLC, Newark, DE (US)

( * ) Notice: Subject to any disclaimer, the term of this patent is extended or adjusted under 35 U.S.C. 154(b) by 0 days.

(21) Appl. No.: 14/185,518

(22) Filed: Feb. 20, 2014

(65) Prior Publication Data

US 2014/0314513 A1    Oct. 23, 2014

Related U.S. Application Data

(63) Continuation of application No. PCT/EP2012/066374, filed on Aug. 24, 2012.

(30) Foreign Application Priority Data

Aug. 26, 2011    (DE) .......................... 10 2011 053 035

(51) Int. Cl.
*F16B 19/10* (2006.01)
*F16B 5/04* (2006.01)

(52) U.S. Cl.
CPC ............... *F16B 19/1054* (2013.01); *F16B 5/04* (2013.01); *F16B 19/1045* (2013.01)

(58) Field of Classification Search
CPC .. F16B 19/1054; F16B 19/1045; F16B 19/10; F16B 5/04
USPC ................................................. 411/34, 38, 43
See application file for complete search history.

(56) References Cited

U.S. PATENT DOCUMENTS

| | | | | |
|---|---|---|---|---|
| 2,030,166 A | * | 2/1936 | Huck | 411/34 |
| 2,030,167 A | * | 2/1936 | Miller | 411/34 |
| 2,061,628 A | * | 11/1936 | Huck | 411/34 |
| 2,324,142 A | | 7/1943 | Eklund | |
| 2,397,111 A | * | 3/1946 | Huck | 411/43 |
| 2,887,003 A | * | 5/1959 | Brilmyer | 411/34 |
| 3,107,572 A | * | 10/1963 | Orloff | 411/34 |
| 3,136,203 A | * | 6/1964 | Davis | 411/38 |
| 3,136,204 A | * | 6/1964 | Reynolds | 411/70 |
| 3,215,024 A | * | 11/1965 | Brilmyer et al. | 411/361 |
| 3,277,771 A | * | 10/1966 | Reynolds | 411/39 |
| 3,348,444 A | * | 10/1967 | Brignola | 411/38 |

(Continued)

FOREIGN PATENT DOCUMENTS

| | | |
|---|---|---|
| DE | 102010002847 | 9/2011 |
| EP | 0398403 | 11/1990 |

(Continued)

*Primary Examiner* — Gay Ann Spahn
(74) *Attorney, Agent, or Firm* — Kofi Schulterbrandt; Michael P. Leary

(57) ABSTRACT

A blind rivet having a hollow rivet body made of plastic, an elongated shank with a bore, a head at one end of the shank and a foot end on the opposite end of the shank, and having, in the bore, a mandrel that has a mandrel shank with a drawing end and a mandrel head that acts on the foot end, the shank has a first region located between the head and the foot end, and has a second region with reduced cross-section and reduced wall thickness as compared to the first region. The regions arranged such that, as a result of a process in which the head is pressed against one side of a workpiece and the foot end is simultaneously drawn toward the other side of the workpiece with the aid of the mandrel, the wall of the shank forms a roll fold with an annular bead.

11 Claims, 3 Drawing Sheets

(56) References Cited

U.S. PATENT DOCUMENTS

| | | | |
|---|---|---|---|
| 3,365,998 A * | 1/1968 | Zahodiakin | 411/34 |
| 3,685,391 A * | 8/1972 | Gapp et al. | 411/70 |
| 3,698,278 A * | 10/1972 | Trembley | 411/34 |
| 3,702,088 A * | 11/1972 | Schmitt | 411/44 |
| 4,046,053 A * | 9/1977 | Alvi et al. | 411/43 |
| 4,089,247 A * | 5/1978 | Dahl et al. | 411/34 |
| 4,142,439 A * | 3/1979 | Landt | 411/34 |
| 4,237,768 A * | 12/1980 | Volkmann | 411/54 |
| 4,312,613 A * | 1/1982 | Binns | 411/34 |
| 4,318,650 A * | 3/1982 | LLauge | 411/38 |
| 4,355,934 A * | 10/1982 | Denham et al. | 411/38 |
| 4,402,638 A * | 9/1983 | Tanaka | 411/34 |
| 4,580,936 A * | 4/1986 | Francis et al. | 411/38 |
| 4,639,174 A * | 1/1987 | Denham et al. | 411/34 |
| 4,639,175 A * | 1/1987 | Wollar | 411/38 |
| 4,875,815 A * | 10/1989 | Phillips, II | 411/38 |
| 4,988,247 A * | 1/1991 | Summerlin | 411/38 |
| 5,030,050 A * | 7/1991 | Auriol et al. | 411/38 |
| 5,152,648 A * | 10/1992 | Pratt | 411/43 |
| 5,248,231 A * | 9/1993 | Denham et al. | 411/43 |
| 5,375,953 A * | 12/1994 | Krug et al. | 411/43 |
| 5,501,695 A * | 3/1996 | Anspach et al. | 411/34 |
| 5,503,510 A * | 4/1996 | Golan | 411/43 |
| 6,224,310 B1 * | 5/2001 | Summerlin et al. | 411/34 |
| 8,297,897 B2 * | 10/2012 | Auriol et al. | 411/43 |
| 8,348,565 B2 * | 1/2013 | Khalil et al. | 411/34 |
| 8,911,190 B2 * | 12/2014 | Saltenberger et al. | 411/38 |
| 2002/0119024 A1 * | 8/2002 | Jennings et al. | 411/38 |
| 2008/0025811 A1 * | 1/2008 | Auriol et al. | 411/43 |
| 2008/0170926 A1 * | 7/2008 | Taylor | 411/43 |
| 2008/0219797 A1 * | 9/2008 | Singh et al. | 411/33 |
| 2008/0219799 A1 * | 9/2008 | Auriol et al. | 411/43 |
| 2009/0016842 A1 * | 1/2009 | Auriol et al. | 411/43 |
| 2010/0074710 A1 * | 3/2010 | Auriol et al. | 411/43 |
| 2011/0116888 A1 * | 5/2011 | Auriol | 411/45 |
| 2013/0177365 A1 * | 7/2013 | Schneider et al. | 411/43 |
| 2013/0243542 A1 * | 9/2013 | Saltenberger et al. | 411/43 |

FOREIGN PATENT DOCUMENTS

| | | |
|---|---|---|
| EP | 0536957 | 4/1993 |
| EP | 0672838 | 9/1995 |
| WO | 2005075841 | 8/2005 |
| WO | 2011113498 | 9/2011 |

* cited by examiner

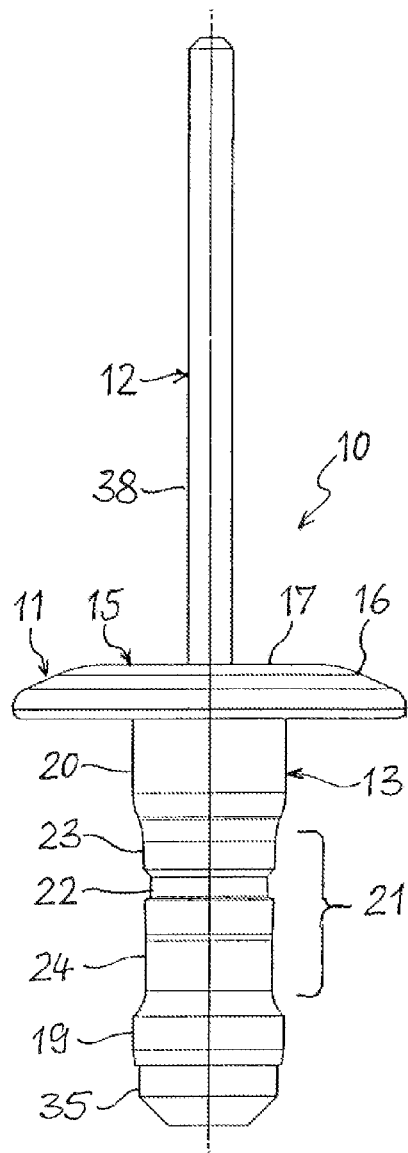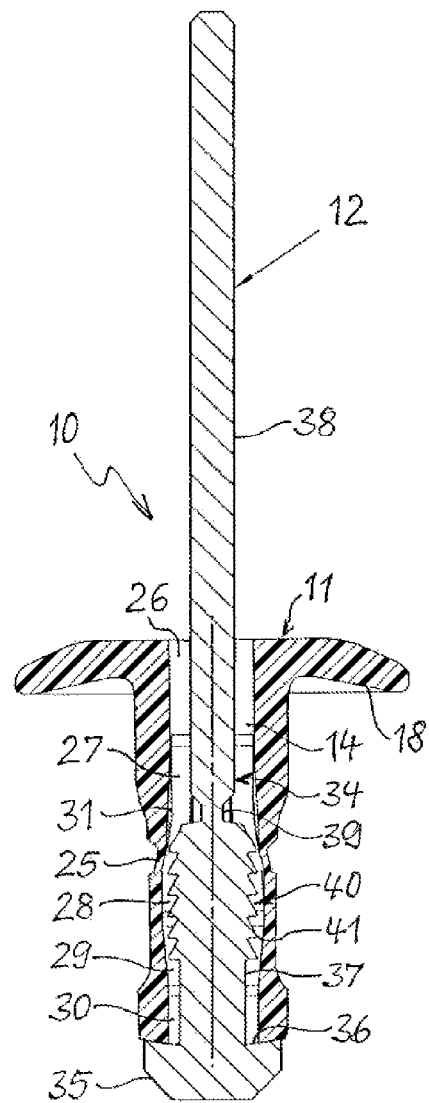
FIG. 1   FIG. 2

BLIND RIVET WITH A PLASTIC RIVET BODY

CROSS-REFERENCE TO RELATED APPLICATIONS

This application is a continuation of PCT/EP2012/066474, filed Aug. 24, 2012 which claims priority from German Patent Application No. DE 10 2011 053 035.5, filed Aug. 26, 2011, the disclosure of which is incorporated herein by reference in its entirety.

FIELD OF THE INVENTION

The invention concerns a blind rivet having a hollow rivet body made of plastic, which has an elongated shank that extends coaxially to a longitudinal center axis of the blind rivet and has a bore, having a head extending radially at one end of the shank for contact with an accessible side of a workpiece, and having, at the opposite end, a foot end that is passed through an opening in the workpiece, and having, located in the bore of the rivet body, a mandrel that has a mandrel shank with a drawing end projecting out of the head of the rivet body and with a mandrel head that stands in operative connection with the foot end of the rivet body in order to transmit a force to the rivet body during setting of the blind rivet.

BACKGROUND OF THE INVENTION

Blind rivets are used to permanently join workpieces that are in contact with one another. The workpieces typically have holes passing through them that are brought into alignment with one another and into which the blind rivet is placed and then fastened by deformation. A fastened blind rivet results in a clearance-free seating in the holes of the workpieces and clamps the workpieces together. Normally, a blind rivet is never removed again. However, in cases in which repair of the joined parts is necessary or when a blind rivet has been set incorrectly, it is necessary to remove a blind rivet.

In the automotive industry, uses of blind rivets include fastening door module supports that are populated with attached parts such as power-window motors, loudspeakers, and other parts if applicable, to the door frame using multiple blind rivets. Failures of individual attached parts can make it necessary for doors to be disassembled and the door module supports to be removed. The blind rivets previously used must be drilled out for the disassembly. During this process, wandering of the drill can occur when the rivet mandrel is made of a relatively hard material, such as steel, and the rivet body is made of a relatively soft material, such as aluminum. Thus it is not uncommon for the door frame and also the module support to be damaged during the drilling-out process. The drilling chips and removed parts of the rivet fall to the ground or even into the blind area of the door, and can only be removed from the latter with extra effort. There is thus a need to create a blind rivet for these and other applications which can be released in a simple manner and can be removed in a single piece. In addition, the blind rivet must be simple to install and must join the workpieces firmly and permanently to one another after assembly.

A blind rivet that is intended to be removed in a single piece is known from EP 1,728,569 A1. In this blind rivet, which has a rivet body with a head designed as a flange and has a rivet mandrel passing through the rivet body, the rivet mandrel is shaped such that it can be pulled at least partially through the rivet body and out of the end of the rivet body opposite the flange during setting of the blind rivet. In addition, the flange is provided with a stepped region for the placement of a rivet removal tool, with the flange being dimensioned such that it does not deform or break when the rivet is withdrawn. In this blind rivet, the rivet body is made of plastically deformable metal and is dimensioned such that it projects only a short distance on the blind side of the workpieces. Accordingly, setting of the rivet forms only a comparatively small bead, which can be pressed together by a tensile force acting on the rivet body, in order to thus allow the blind rivet to be pulled from the holes in the workpieces. However, it is disadvantageous here that the holding forces of the blind rivet are very limited, and, like the release forces, are strongly dependent on manufacturing-related dimensional variations in the holes and the rivet parts.

In addition, from U.S. Pat. No. 4,238,446 which is a corresponding application to DE 29 06 250 A1 is known a plastic blind rivet with a mandrel having an expanded head and with a rivet body surrounding the mandrel, in which the mandrel has a series of engagement teeth on its outer circumference, and the inside wall surface of the rivet body has a series of anchor steps suitable for engaging the engagement teeth. The rivet body is provided with a flange-like head part and with an end that is inseparably joined to the mandrel head, and is deformed during setting of the blind rivet by partial withdrawal of the mandrel from the rivet body such that a part of the wall surface of the rivet body adjacent to the mandrel head is folded outward around the mandrel head and, together with the mandrel head, is pulled into the other part of the wall surface, with the latter bulging outward. In this process, the folded section of the wall surface is forced in between the mandrel head and the unfolded section of the wall surface, in which process the unfolded wall section must be stretched very severely. This requires relatively high forces for setting the blind rivet and results in severe stressing of the plastic material, restricting the choice of material. The prior art plastic blind rivet is not designed for easy removal of the set blind rivet.

According to WO 2011/113498 A1, which is an English equivalent of DE 10 2010 002847.9, the blind rivet has a hollow body made of plastic, which has an elongated shank that extends coaxially to a longitudinal center axis of the blind rivet and has a bore, a head extending radially at one end of the shank for contact with an accessible side of a workpiece and, at the opposite end, a foot end that is passed through an opening in the workpiece. Located in the rivet body is a mandrel that has a mandrel shank with a drawing end projecting out of the head of the rivet body and has a mandrel head that stands in operative connection with the foot end of the rivet body in order to transmit a force to the rivet body during setting of the blind rivet. The shank of the rivet body has, located between the head and the foot end, a first region with reduced cross-section and reduced wall thickness as compared to the regions adjoining the head and the foot end, wherein a second region with reduced cross-section and reduced wall thickness as compared to the first region is located within the first region in such a manner that, as a result of a process in which the head is pressed against one side of the workpiece and the foot end is simultaneously drawn toward the other side of the workpiece with the aid of the mandrel, the wall of the section of the first region located between the foot end and the second region forms a roll fold that on the outside rests against the section located between the head and the second region, and forms an annular bead pressed against the workpiece.

In the blind rivet according to WO 2011/113498 A1, which is an English equivalent of DE 10 2010 002847.9, during the fastening process the shank of the rivet body forms an annular bead on the blind side of the workpiece due to the folding; the annular bead surrounds a part of the shank adjoining the workpiece and rests against the edge region of the mounting hole surrounding the mounting hole in the workpiece. The annular bead is pressed firmly against the workpiece by the tensile force exerted on the mandrel that is transmitted by the mandrel head to the foot end of the folded shank. In this way, a strong axial contact pressure is achieved between the workpieces joined by the blind rivet, since the tensile force exerted during fastening of the rivet is transmitted directly to the workpiece without deflection, and the axial contact pressure need not be achieved through components of a force spreading the rivet shank apart. The blind rivet according to the invention further has the advantage that the annular bead of the folded shank resting against the blind side of the workpiece produces a good seal. This seal results not only from the strong contact pressure of the annular bead, but also profits from the fact that the annular bead works together with the edge of the workpiece surrounding the mounting hole at a distance from the mounting hole, so that damage or faulty formation of the hole edge cannot impair the seal. Even an eccentric position of the blind rivet with respect to the mounting hole is compensated by the larger diameter of the annular bead, and does not impair the seal action. In the fastened position, the mandrel is anchored in the shank of the blind rivet with the aid of locking means. In this way, the part of the shank extending from the foot end to the contact surface of the annular bead is loaded with the axial clamping force and experiences an elastic compression, and thus creates a spring action that counteracts vibratory loads and reduces effects on the clamping force caused by temperature changes.

In the blind rivet according to WO 2011/113498 A1, which is an English equivalent of DE 10 2010 002847.9, when the hollow rivet body made of plastic is primary molded, asymmetrical stresses can occur in the rivet body. These material stresses present in the rivet body after the fabrication process can lead to asymmetrical deformation of the rivet body during setting of the blind rivet and can impair a uniform contact of the annular bead with the workpiece.

BRIEF SUMMARY OF THE INVENTION

The object of the invention is to improve a blind rivet in accordance with the main patent in such a manner that the rivet body deforms uniformly during setting of the blind rivet, even if asymmetrical stresses are present in the rivet body after primary molding.

According to the invention, this object is achieved by a blind rivet with the features specified in claim 1. Advantageous embodiments of the blind rivet are specified in claims 2 through 11.

The object is attained in a blind rivet of the aforementioned type by the means that the bore in the rivet body has, in the head part of the shank located between the head and the second region, at least one guide element by which the shank is guided on the mandrel shank.

The invention has the advantage that the rivet body is guided on the rivet mandrel during the riveting process, and thus cannot slip laterally. The sections of the rivet body that rest upon one another during formation of the roll fold are held in a mutually centered position by the rivet mandrel and are thus forced to form a uniform and symmetrical annular bead.

Preferably, the guide element has a plurality of radially inward directed projections, which are arranged at a uniform spacing from one another in the circumferential direction.

The projections can be embodied as longitudinal ribs that extend in the direction of the longitudinal center axis. The embodiment of individual projections or ribs has the advantage that the friction between the rivet body and the mandrel shank during setting of the blind rivet, and thus the corresponding effect on the setting force, remains small. Moreover, the end regions of the longitudinal ribs facing the foot end can have guide surfaces angled towards the longitudinal center axis, which approach the longitudinal center axis with increasing distance from the foot end. In this way, the guide surfaces form lead-in ramps, which facilitate the entry of the guide section of the mandrel shank into the bore section that is provided with longitudinal ribs.

Alternatively, the guide element can also be composed of an annular bead or collar that projects into the bore of the rivet body and rests against the mandrel shank during the setting process.

According to another proposal of the invention, a contribution to uniform deformation of the rivet body during setting of the blind rivet can be made by the means that the second region has a shape that expands conically towards the foot end. As a result of this shape, during the setting of the blind rivet, force actions are enhanced that tend to expand the wall of the section adjacent to the second region between said region and the foot end and initiate the formation of the roll fold, and any influences of manufacturing-related asymmetric material stresses in the rivet body are overcome. It has proven to be especially advantageous for the wall of the second region to be inclined at an angle of at least 5°, preferably at an angle of 10°, to the longitudinal center axis.

The mandrel shank has, according to the invention, locking means, for example a coarse thread or saw teeth, by means of which at least a section of the mandrel shank can be held securely in the rivet body. The locking means may form a guide section that works together with the guide element, wherein the radial distance of the guide element from the longitudinal center axis is equal to or shorter than the radial distance of the locking means from the longitudinal center axis. For engagement of the locking means, the bore of the rivet body adjacent to the head can have a cylindrical bore section whose diameter is smaller than the diameter of the locking means formed on the mandrel shank.

The rivet body preferably is designed such that the second region subdivides the first region into two sections, wherein the wall thickness of the first section of the first region adjacent to the head is greater than the wall thickness of the second section of the first region adjacent to the foot end. It has additionally proven advantageous for the bore of the rivet body to have a first conical bore section whose diameter increases towards the foot end, and a second conical bore section whose diameter decreases towards the foot end, wherein the ends of the conical bore sections with greatest diameters terminate at a cylindrical bore section that is located on the side of the second region facing the foot end and near to the same.

The blind rivet according to the invention, after setting and joining of workpieces, can be removed again in a single piece from the mounting holes penetrating the workpieces without great effort. To this end, it is sufficient to drive the mandrel back a distance in the direction of the blind side while overcoming or destroying its anchoring in the shank with the aid of a driving tool, but without pushing it completely out of the shank. Driving the mandrel back relaxes the folded shank, and its foot end comes free from the mandrel head. If the head of the rivet body is then pulled with the aid of a removal tool, such as is known from the aforementioned EP 1,728,569 A1, for example, the roll fold can be pushed back and the rivet body can be pulled out of the mounting opening together with the mandrel held therein. In this way, the blind rivet can be released and removed for purposes of repair without remnants remaining on the blind side of the workpieces. To simplify the removal of the blind rivet, the head of the rivet body can have a tool engagement region, for example an undercut or a recess, in which a removal or pulling tool can engage. Furthermore, a guide for a driving tool to drive back the mandrel can be formed on the head of the rivet body.

The blind rivet according to the invention is suitable both for setting with hand-operated tools and for automated riveting processes. For automated processing, the head of the rivet body can be attached to, or formed on, one or more belts, bands, or wires that hold a plurality of blind rivets in a row.

BRIEF DESCRIPTION OF THE DRAWINGS

The invention is explained in detail below with reference to an exemplary embodiment that is shown in the drawings. They show:

FIG. 1 a view of a blind rivet according to the invention,

FIG. 2 a cross-section of the blind rivet from FIG. 1,

DETAILED DESCRIPTION OF THE INVENTION

Figure 3:
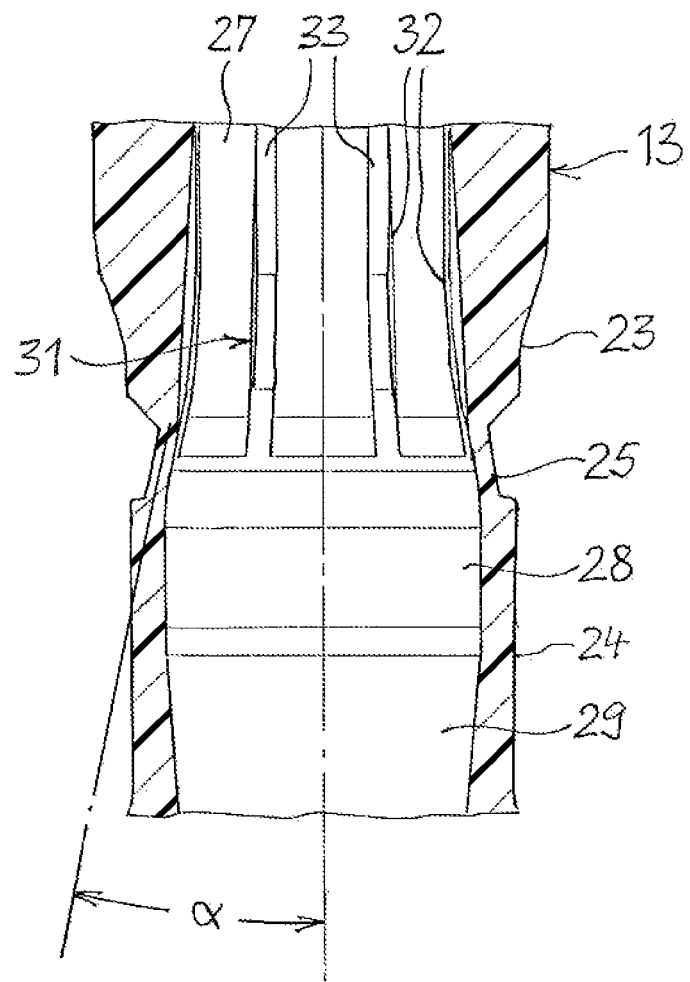
FIG. 3 an enlarged detail of the rivet body according to the invention.

The blind rivet 10 shown in FIGS. 1 and 2 consists of a rivet body 11 and a mandrel 12. The rivet body 11 is made of plastic and has an elongated shank 13 with a through-bore 14, in which the mandrel 12 is located. One end of the shank 13 forms a head 15, which takes the form of a disk-shaped flange 16 and is intended to contact an accessible side of a workpiece. On the side facing away from the shank 13, the head 15 has a flat support surface 17 for supporting the forward end of a rivet setting tool. The flange 16 radially overhanging the shank 13 is domed in the manner of a spring washer, and has a concave contact surface 18 on the side facing the shank 13. As a result, the flange 16 can yield elastically when the head 15 of the blind rivet 10 is pressed against a workpiece.

The end of the shank 13 opposite the head 15 constitutes a foot end 19; with said foot end forward, the shank 13 is passed through the mounting openings of workpieces to be joined to one another. The foot end 19 and a head section 20 of the shank 13 adjoining the head 15 have a cylindrical outer surface and have essentially the same outside diameter. Extending between the head section 20 and the foot end 19 is a first cylindrical region 21 of the shank 13, whose outside diameter is approximately 10% to 20%, in particular 15%, smaller than the outside diameter of the head section 20. The transitions from the head section 20 and the foot end 19 to the first region 21 are conical and are rounded to a greater or lesser degree. Located within the first region 21 is a second region 22 with a relatively short axial length, which has an outside diameter that is smaller yet again by approximately 10%. The second region 22 subdivides the first region 21 into a first section 23 adjacent to the head section 20 and a second section 24 adjacent to the foot end 19, wherein the axial length of the first section 23 is approximately half the axial length of the second section 24. The axial edges of the second region 22 are conical, with their mutual separation increasing radially towards the outside. Between its edges, the second region 22 has a conical wall 25, whose diameter increases towards the foot end 19. The wall 25 is inclined at an angle α to the longitudinal center axis. The angle α should be at least 5°, preferably 10°. The axial length of the second region 22 is approximately twice to three times the size of its wall thickness.

The bore 14 passing through the rivet body 11 has different bore sections. The head 15 contains a first cylindrical bore section 26, which is adjoined by a first conical bore section 27, whose inside diameter increases towards the foot end 19. The bore section 27 terminates with its largest diameter at a second cylindrical bore section 28, which is located on the side of the second region 22 facing the foot end 19 and in the vicinity of the same. Extending towards the foot end 19 from the bore section 28 is a second conical bore section 29 whose inside diameter decreases towards the foot end 19. Thus, the bore 14 has the largest inside diameter at the bore section 28. The second conical bore section 29 terminates with its smallest inside diameter at a third cylindrical bore section 30, which extends through the foot end 19 of the shank 13.

As can be seen especially clearly in FIG. 3, in the first conical bore section 27, a guide element 31 is formed that consists of multiple longitudinal ribs 32 that extend in the direction of the longitudinal center axis and are spaced a distance apart from one another in the circumferential direction. On their top sides, the longitudinal ribs 32 have guide surfaces 33 whose ends facing the foot end 19 transition smoothly into the conical bore section 27. The end regions of the guide surfaces 33 adjoining the ends are inclined to the longitudinal center axis at the same angle as the wall 25, so that they approach the longitudinal center axis with increasing distance from the foot end 19. After approximately one quarter of their axial length, the inclination of the guide surfaces 33 decreases continuously to the axial center, and from there on the guide surfaces 33 run parallel to the longitudinal center axis so that the height of the longitudinal ribs 32 decreases steadily in the direction of the head 15 from the center.

The mandrel 12 has an elongated mandrel shank 34 and a mandrel head 35 located at one end of the mandrel shank 34. The mandrel head 35 has a greater diameter than the mandrel shank 34 and has, on the side facing the mandrel shank 34, a contact surface 36 for the foot end 19 of the shank 13. The contact surface 36 is in the shape of a concave conical surface whose generating line forms, with the longitudinal center axis of the mandrel 12, an angle of essentially 80°. The end of the mandrel head 35 opposite the contact surface 36 is in the shape of a truncated cone in order to facilitate insertion of the blind rivet 10 in the mounting opening of the workpieces. The mandrel shank 34 has a mounting part 37 with larger diameter and a drawing part 38 with smaller diameter. Located between the mounting part 37 and the drawing part 38 is a predetermined breaking point 39, which has a smaller cross-section than the drawing part 38. The end of the mounting part 37 adjacent to the predetermined breaking point forms a step, which works together with the setting tool or a stop to limit the drawing travel of the mandrel shank 34.

On part of its length, the mounting part 37 has locking means 40 in the form of ring-shaped ribs 41, which are spaced apart from one another and have a sawtooth-like cross-section that is composed of conical surfaces and radial surfaces. The conical surfaces of the ribs 41 face the predetermined breaking point 39, in order to make it easier for the ribs 41 to penetrate the locking region of the shank 13, which is composed of the cylindrical bore section 25, the initial end of the conical bore section 27, and partly of the longitudinal ribs 32. The outside diameter of the ribs 41 is slightly larger than the inside diameter of the bore sections 26, 30. As a result, the mandrel 12 is held fast in the bore 14 after insertion therein, so that the rivet body 11 and the mandrel 12 compose an easy-to-manipulate unit. A small part of the drawing part 38 is located in the bore sections 26, 27 here, and the majority of its length projects out of the bore 14. The outside diameter of the ribs 41 of the mandrel 12 is smaller than the inside diameter of the bore 14 in the region of the bore section 28 and wall 25 when the mandrel 12 is inserted fully in the shank 13.

Figure 4:
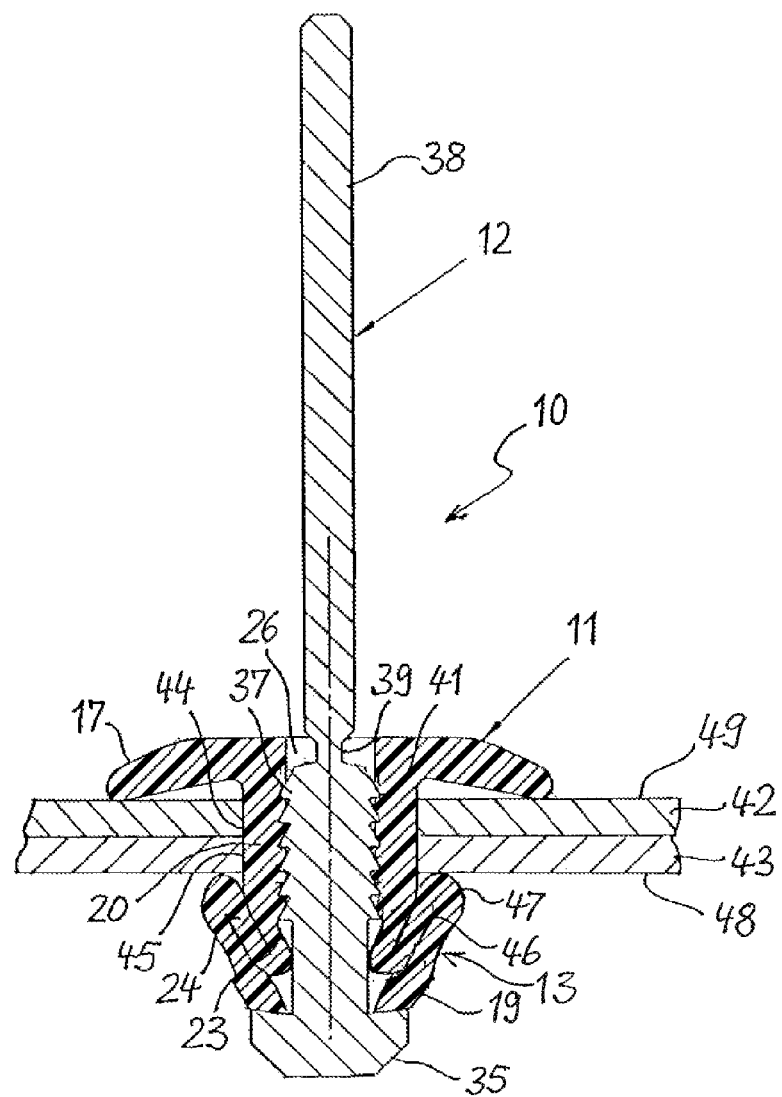
FIG. 4 a cross-section through a joining of two workpieces using a blind rivet according to the invention.

As is shown in FIG. 4, in order to join two workpieces 42, 43 the blind rivet 10 is inserted in aligned mounting openings 44, 45 of the workpieces 42, 43 and then, with the aid of a setting tool that bears on the support surface 17, is fastened by the exertion of a tensile force on the drawing part 38 of the mandrel 12. In FIG. 4, the blind rivet 10 is in the state of nearly finished installation, in which break-off of the drawing part 38 is imminent. The mounting part 37 of the mandrel 12 is drawn fully into the locking region in the head section 20 of the shank 13 here. During displacement of the mandrel 12 into the position shown, the section 23 was supported on the mandrel 12 and centered by the contact of the mounting part 37 with the guide surfaces 33 of the longitudinal ribs 32, and the wall of the shank 13 was folded outward in the region of the second section 24 and a roll fold 46 lying over the first section 23 was formed that surrounds, with an annular bead 47, the end of the head section 20 projecting out of the workpiece 43 on the blind side 48 and is pressed against the blind side 48 of the workpiece 43 by the annular bead 47. The annular bead 47 bears against the mandrel head 35 in the axial direction through the foot end 19, said mandrel head being held fast by the ribs 41 in the head section 20 of the shank 13. On the access side 49 of the workpiece 42 opposite the blind side 48, the flange 17 rests against the workpiece 42 and transmits the reaction force from the pressing force of the annular bead 47 to the workpiece 42. The two workpieces 42, 43 are thus firmly clamped and braced against one another between the annular bead 47 and the flange 17.

The tight seal of the joint produced with the aid of the blind rivet 10 is achieved primarily by the firm contact of the flange 17 and of the annular bead 47. The bore 14 passing through the shank 13 is sealed by the contact pressure of the foot end 19 on the mandrel head 35 and additionally by the engagement of the ribs 41 in the head section 20.

The invention is not limited to the exemplary embodiment described, but instead can be realized in a great number of other variants. Thus, for example, the rivet body can be integrated in a component, for example a holder for lines, cables, or modules, in order to mount the component in a single step by fastening the blind rivet in the opening of a support part. The rivet body made of plastic can also be covered with a softer material layer in a two-component injection process, in order to achieve functions such as vibration damping or to further improve the water-tightness. The rivet body made of plastic additionally provides the option of fastening components to support parts in an electrically insulating manner. If electrically conductive connections are to be produced, for example in order to permit electrostatic discharge, this can be achieved by making the rivet body out of electrically conductive plastics. For use in visible areas, the rivet body can be made of colored plastic, with it being possible to match the color to the specific application.

The invention claimed is:

1. A blind rivet, having a hollow rivet body made of plastic, which has an elongated shank that extends coaxially to a longitudinal center axis of the blind rivet and has a bore, having a head extending radially at one end of the shank for contact with an accessible side of a workpiece, and having, at the opposite end of the shank, a foot end that is passed through an opening in the workpiece, and having, located in the bore of the rivet body, a mandrel that has a mandrel shank with a drawing end projecting out of the head of the rivet body and has a mandrel head that stands in operative connection with the foot end of the rivet body in order to transmit a force to the rivet body during setting of the blind rivet, wherein the shank of the rivet body has, located between the head and the foot end, a first region with reduced cross-section and reduced wall thickness as compared to the regions adjoining the head and the foot end, and a second region with reduced cross-section and reduced wall thickness as compared to the first region, and the second region is located within the first region in such a manner that, as a result of a process in which the foot end is drawn toward the head with the aid of the mandrel, a wall of a section of the first region located between the foot end and the second region forms a roll fold that on an outside rests against a head part of the shank located between the head and the second region, and forms an annular bead that can be pressed against a second workpiece, wherein the bore has, in the head part of the shank located between the head and the second region, at least one guide element by which the shank is guided on the mandrel shank during setting of the blind rivet, and wherein the second region has a wall, which has a shape that expands conically towards the foot end.

2. The blind rivet according to claim 1, wherein the guide element has a plurality of radially inward directed projections.

3. The blind rivet according to claim 2, wherein the projections are embodied as longitudinal ribs that extend in the direction of the longitudinal center axis and are spaced apart from one another in the circumferential direction.

4. The blind rivet according to claim 3, wherein the end regions of the longitudinal ribs facing the foot end have guide surfaces angled towards the longitudinal center axis, which approach the longitudinal center axis with increasing distance from the foot end.

5. The blind rivet according to claim 1, wherein the guide element is composed of an annular bead or collar that projects into the bore.

6. The blind rivet according to claim 1, wherein the wall of the second region is inclined at an angle of 5° or greater to the longitudinal center axis.

7. The blind rivet according to claim 6, wherein the wall of the second region is inclined at an angle of 10° to the longitudinal center axis.

8. The blind rivet according to claim 1, wherein the mandrel shank has locking means by means of which at least a section of the mandrel shank can be held in the rivet body, and in that the bore of the rivet body adjacent to the head has a bore section whose diameter is smaller than the diameter of the locking means formed on the mandrel shank.

9. The blind rivet according to claim 8, wherein the radial distance of the guide element from the longitudinal center axis is equal to or shorter than the radial distance of the locking means from the longitudinal center axis.

10. The blind rivet according to claim 1, wherein the second region subdivides the first region into two sections, wherein the wall thickness of the first section of the first region adjacent to the head is greater than the wall thickness of the second section of the first region adjacent to the foot end.

11. The blind rivet according to claim 1, wherein the bore of the rivet body has a first conical bore section whose diameter increases towards the foot end, and a second conical bore section whose diameter decreases towards the foot end, wherein the ends of the conical bore sections with greatest diameters terminate at a cylindrical bore section that is located on the side of the second region facing the foot end and near to the same.

* * * * *